United States Patent
Takano et al.

(10) Patent No.: US 12,095,074 B2
(45) Date of Patent: Sep. 17, 2024

(54) NONAQUEOUS ELECTROLYTE SECONDARY BATTERY

(71) Applicant: SANYO Electric Co., Ltd., Daito (JP)

(72) Inventors: Akira Takano, Osaka (JP); Oose Okutani, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 836 days.

(21) Appl. No.: 16/973,547

(22) PCT Filed: Jun. 18, 2019

(86) PCT No.: PCT/JP2019/024057
§ 371 (c)(1),
(2) Date: Dec. 9, 2020

(87) PCT Pub. No.: WO2020/004135
PCT Pub. Date: Jan. 2, 2020

(65) Prior Publication Data
US 2021/0257607 A1    Aug. 19, 2021

(30) Foreign Application Priority Data
Jun. 28, 2018    (JP) .................................. 2018-123731

(51) Int. Cl.
*H01M 4/134*    (2010.01)
*H01M 4/38*     (2006.01)
(Continued)

(52) U.S. Cl.
CPC .......... *H01M 4/134* (2013.01); *H01M 4/386* (2013.01); *H01M 4/483* (2013.01); *H01M 4/661* (2013.01);
(Continued)

(58) Field of Classification Search
None
See application file for complete search history.

(56) References Cited

U.S. PATENT DOCUMENTS

2010/0233524 A1    9/2010  Hina et al.
2018/0323419 A1    11/2018 Shiraga et al.

FOREIGN PATENT DOCUMENTS

JP    H05-174863 A    7/1993
JP    H07-142042 A    6/1995
(Continued)

OTHER PUBLICATIONS

JPH11233148A—machine translation (Year: 1999).*
International search report dated Sep. 10, 2019, issued in counterpart Application No. PCT/JP2019/024057. (1 page).

*Primary Examiner* — Haroon S. Sheikh
(74) *Attorney, Agent, or Firm* — WHDA, LLP

(57) ABSTRACT

A nonaqueous electrolyte secondary battery which includes a metal foil collector of one of a positive electrode plate and a negative electrode plate which is exposed at at least part of the outermost circumferential surface of the electrode group in a rolling direction, and the collector is in contact with the inner surface of a case main body. When a region of the inner surface of the case main body from the opening-portion-side edge to the position in contact with the bottom-portion-side edge of the gasket is denoted as a first region S1 and a region of the inner surface of the case main body opposing the outermost circumferential surface of the electrode group is denoted as a second region S2, the arithmetic mean roughness Ra1 of the first region S1 and the arithmetic mean roughness Ra2 of the second region S2 satisfy Ra1<Ra2.

7 Claims, 3 Drawing Sheets

(51) Int. Cl.
  *H01M 4/48*         (2010.01)
  *H01M 4/66*         (2006.01)
  *H01M 10/0587*      (2010.01)
  *H01M 50/107*       (2021.01)
  *H01M 50/147*       (2021.01)
  *H01M 50/183*       (2021.01)
  *H01M 50/528*       (2021.01)
  *H01M 50/533*       (2021.01)
  *H01M 50/534*       (2021.01)
  *H01M 50/536*       (2021.01)

(52) U.S. Cl.
  CPC ..... *H01M 10/0587* (2013.01); *H01M 50/107* (2021.01); *H01M 50/183* (2021.01); *H01M 50/528* (2021.01); *H01M 50/533* (2021.01); *H01M 50/534* (2021.01); *H01M 50/536* (2021.01); *H01M 50/147* (2021.01)

(56) References Cited

FOREIGN PATENT DOCUMENTS

| | | | |
|---|---|---|---|
| JP | H09-161736 | A | 6/1997 |
| JP | H11233148 | A * | 8/1999 |
| JP | 2003-249232 | A | 9/2003 |
| JP | 2013-73804 | A | 4/2013 |
| WO | 2009/144919 | A1 | 12/2009 |
| WO | 2017/085918 | A1 | 5/2017 |

\* cited by examiner

NONAQUEOUS ELECTROLYTE SECONDARY BATTERY

TECHNICAL FIELD

The present invention relates to a nonaqueous electrolyte secondary battery.

BACKGROUND ART

In the related art, a known secondary battery includes a power generation element in which a positive electrode plate and a negative electrode plate are rolled with a separator interposed therebetween (electrode group) and a metal case (case main body) storing the power generation element, wherein the metal case is hermetically sealed by a sealing plate (sealing body) with a gasket interposed therebetween, and includes a configuration in which unevenness of the inner surface of the sealing portion of the metal case is reduced and the number of peaks is reduced (refer to PTL 1). It is disclosed that, according to the configuration, a high-viscosity sealing agent being made to readily fill the space causing the unevenness enables a battery having excellent resistance to leakage of an electrolytic solution to be obtained.

In addition, in a known configuration, a battery can constituting an alkaline manganese battery or the like is in the shape of a tube that has a bottom and that has a side-wall main portion and a swaged portion into which a gasket is inserted and which is located at a position nearer than the side-wall main portion to an opening, wherein the swaged portion is smoother than the side-wall main portion (refer to PTL 2). It is disclosed that, according to the configuration, the contact area between the battery can and the positive electrode mixture being increased enables the contact resistance to be reduced and enables leakage of a liquid to be suppressed from occurring.

Further, in a known secondary battery, a metal foil negative electrode collector is exposed at the outermost circumferential surface of an electrode group, and the negative electrode collector is in contact with the inner surface of the battery case so that the heat dissipation effect can be improved (refer to PTL 3).

CITATION LIST

Patent Literature

PTL 1: Japanese Published Unexamined Patent Application No. 7-142042
PTL 2: Japanese Published Unexamined Patent Application No. 9-161736
PTL 3: International Publication No. 2009/144919

SUMMARY OF INVENTION

Technical Problem

In recent years, uses for secondary batteries have expanded to, for example, drive power supplies for electric cars and storage battery devices for utilizing natural energy, and secondary batteries are required for realizing higher capacity and higher output characteristics and for realizing high reliability of sealing portions. However, there is a possibility of the reliability of the sealed portion deteriorating. For example, an electrolytic solution remaining on a grooved portion formed in the vicinity of an opening portion so as to protrude toward the inside of the case main body may seep to the outside when the opening portion of the case main body is sealed during assembly of the battery, or an electrolytic solution interposed between a gasket and the case main body after assembly may cause rust formation.

Meanwhile, regarding the secondary battery in which a metal foil negative electrode collector is exposed at the outermost circumferential surface of an electrode group and the negative electrode collector is in contact with the inner surface of the battery case, as in the configuration described in PTL 3, if a contact state is poor, since the battery resistance is increased, the output of the secondary battery may be hindered from increasing.

It is an object of the present invention to realize higher output and high reliability of a sealed portion in a nonaqueous electrolyte secondary battery in which a metal foil negative electrode collector is exposed at the outermost circumferential surface of an electrode group and the negative electrode collector is in contact with the inner surface of the battery case.

Solution to Problem

A nonaqueous electrolyte secondary battery according to the present disclosure includes a tubular case main body having an opening portion and a bottom portion, a sealing body fixed to the opening portion of the case main body by swaging with a gasket interposed therebetween, and a roll-type electrode group which is stored in the case main body and in which a positive electrode plate and a negative electrode plate are rolled with a separator interposed therebetween, wherein a metal foil collector of one electrode plate of the positive electrode plate and the negative electrode plate is exposed at at least part of the outermost circumferential surface of the electrode group in the rolling direction, the collector being in contact with the inner surface of the case main body, and when a region of the inner surface of the case main body from the opening-portion-side edge to the position in contact with the bottom-portion-side edge of the gasket is denoted as a first region and a region of the inner surface of the case main body opposing the outermost circumferential surface of the electrode group is denoted as a second region, the arithmetic mean roughness $Ra1$ of the first region and the arithmetic mean roughness $Ra2$ of the second region satisfy $Ra1<Ra2$.

Advantageous Effects of Invention

According to the nonaqueous electrolyte secondary battery of the present disclosure, in the configuration in which the metal foil collector of the electrode plate as the outermost circumferential surface of the electrode group is in contact with the case main body, since the contact area between the collector and the second region of the case main body increases and the contact resistance can be reduced, higher output can be realized. Further, since the wettability of the first region of the case main body deteriorates and the electrolytic solution is readily repelled, the electrolytic solution is suppressed from seeping. Therefore, according to the nonaqueous electrolyte secondary battery of the present disclosure, higher output and, in addition, high reliability of the sealing portion can be realized.

DESCRIPTION OF EMBODIMENTS

The embodiment according to the present invention will be described below in detail with reference to the attached drawings. In the following explanations, specific shapes, materials, numerical values, directions, and the like are exemplifications for the sake of facilitating understanding of the present invention and can be appropriately changed in accordance with the specifications of nonaqueous electrolyte secondary batteries. In this regard, the word "substantially" below is used to denote the case of completely the same and, in addition, the case assumed to be essentially the same. Further, in the case in which a plurality of embodiments and examples are included below, it is essentially intended that features of these be used in appropriate combinations.

Figure 1:
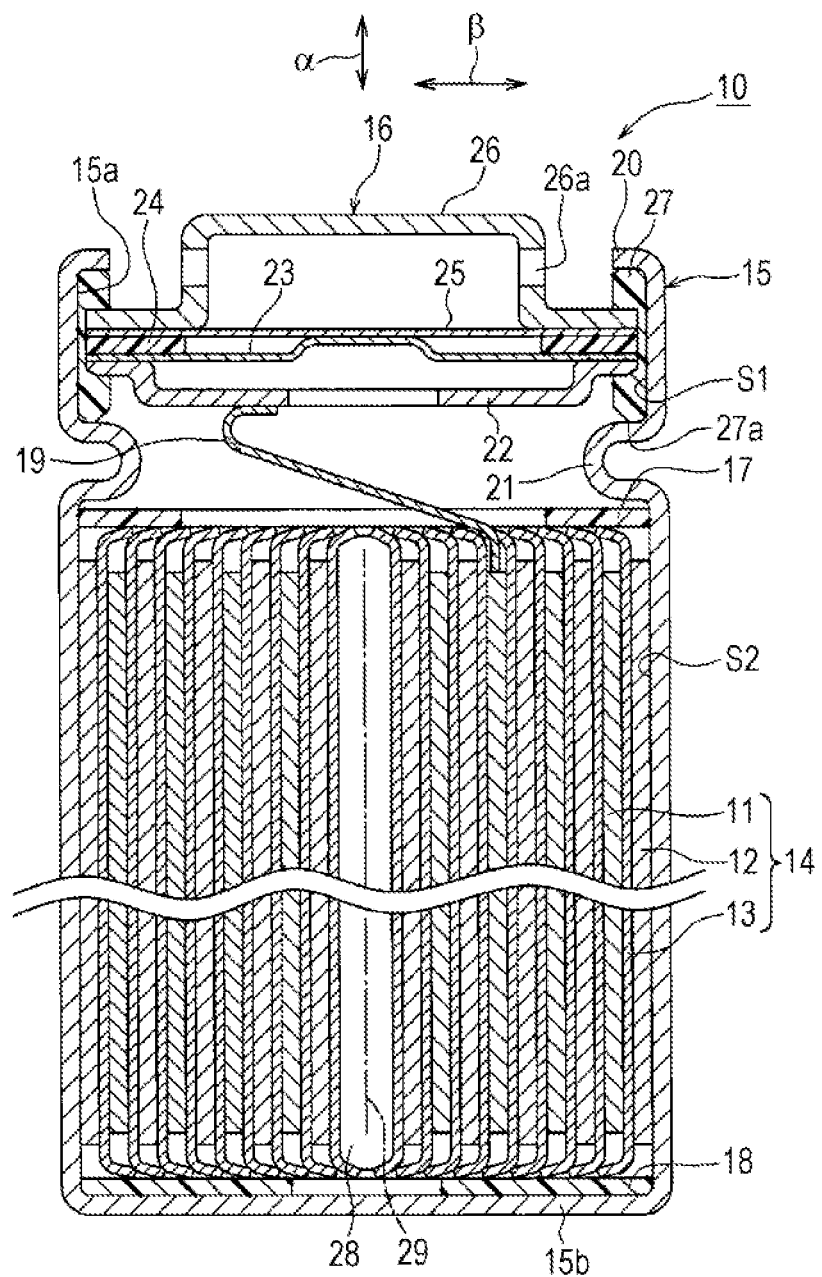
FIG. 1 is a sectional view of a nonaqueous electrolyte secondary battery that is an example of an embodiment.
Figure 2:
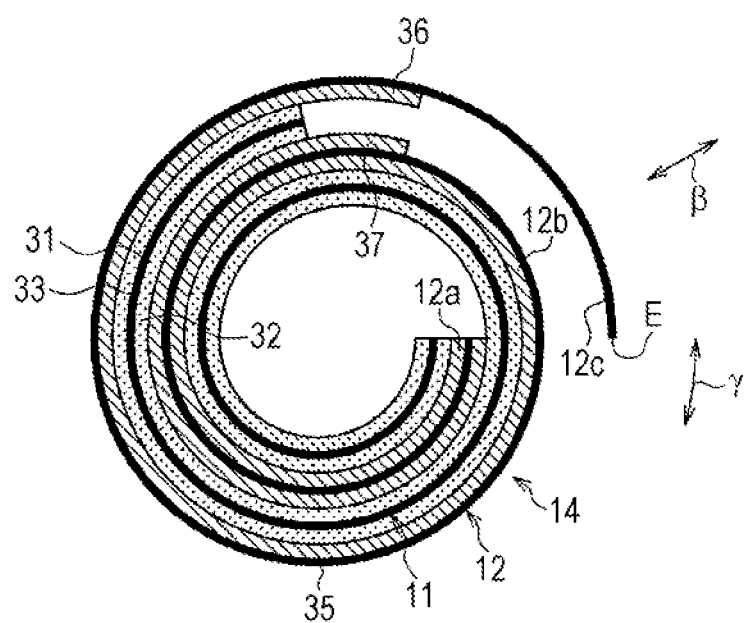
FIG. 2 is a sectional view of a roll outer portion of an electrode group in the direction perpendicular to the axis direction in an example of an embodiment.
Figure 3:
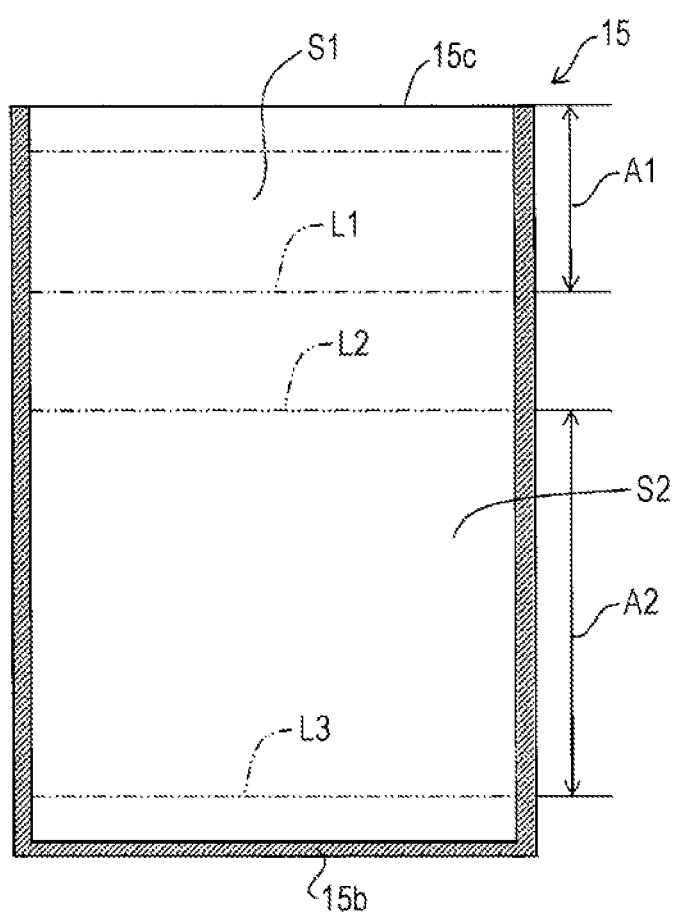
FIG. 3 is a sectional view of a case main body before an electrode group is inserted in an example of an embodiment.

FIG. 1 is a sectional view of a nonaqueous electrolyte secondary battery 10 according to an embodiment. FIG. 2 is a sectional view of a roll outer portion (outer-circumferential-surface-side portion) of an electrode group in the direction perpendicular to the axis direction in the embodiment. FIG. 3 is a sectional view of a case main body 15 before an electrode group 14 is inserted. That is, FIG. 3 is a sectional view of the case main body 15 before a shoulder portion 20 and a grooved portion 21 in FIG. 1 are formed. As illustrated in FIG. 1 to FIG. 3, the nonaqueous electrolyte secondary battery 10 includes a roll-type electrode group 14, a nonaqueous electrolyte (not shown in the drawing) serving as an electrolytic solution, the case main body 15, and a sealing body 16. The electrode group 14 includes a positive electrode plate 11, a negative electrode plate 12, and a separator 13, and the positive electrode plate 11 and the negative electrode plate 12 are spirally rolled with the separator 13 interposed therebetween. One direction of the rolling axis direction of the electrode group 14 may be referred to as "upward", and the other direction of the rolling axis direction may be referred to as "downward". The nonaqueous electrolyte contains a nonaqueous solvent and an electrolyte salt dissolved in the nonaqueous solvent.

Referring to FIG. 2, the positive electrode plate 11 has a band-like positive electrode collector 31 and a positive electrode lead 19 connected to the positive electrode collector 31 (FIG. 1). The positive electrode lead 19 is a conductive member for electrically connecting the positive electrode collector 31 to a positive electrode terminal and extends from the upper end of the positive electrode collector 31 in the electrode group 14 in one direction of the rolling axis direction α (upward). The positive electrode lead 19 is disposed at, for example, a substantially center portion of the electrode group 14 in the radial direction β. The positive electrode lead 19 is a band-like conductive member. There is no particular limitation regarding the constituent material of the positive electrode lead. Preferably, the positive electrode lead 19 is composed of a metal containing aluminum as a primary component. Further, in the positive electrode plate 11, positive electrode active material layers 32 and 33 are disposed on the roll inner surface (inner surface in the radial direction) and on the roll outer surface (outer surface in the radial direction), respectively, of the positive electrode collector. In FIG. 2, the positive electrode active material layers 32 and 33 are indicated by thin dotted portions.

Referring to FIG. 2, the negative electrode plate 12 includes a band-like metal foil negative electrode collector 35 and negative electrode active material layers 36 and 37 disposed on the roll inner surface (inner surface in the radial direction) and on the roll outer surface (outer surface in the radial direction), respectively, of the negative electrode collector 35. In FIG. 2, the negative electrode active material layers 36 and 37 are indicated by diagonally shaded portions. Regarding the negative electrode plate 12 as the outermost circumferential surface of the electrode group 14, the negative electrode collector 35 is in contact with the inner surface of the tubular portion of the case main body 15 serving as a negative electrode terminal, described later, so as to be electrically connected to the case main body 15. For this purpose, the negative electrode collector 35 is exposed at the outermost circumferential surface of the electrode group 14 in the circumferential direction, and the negative electrode collector 35 is in contact with the case main body 15. Consequently, the current collecting performance between the negative electrode plate 12 and the case main body 15 can be ensured.

As described above, the electrode group 14 has a rolled structure in which the positive electrode plate 11 and the negative electrode plate 12 are spirally rolled with the separator 13 interposed therebetween. Each of the positive electrode plate 11, the negative electrode plate 12, and the separator 13 is formed into a band-like shape and is spirally rolled around a roll core so as to take on a state of being alternately stacked in the radial direction β of the electrode group 14. The roll core is removed so as to form a space 28 in the electrode group 14, and the center axis in the longitudinal direction of the space 28 is a rolling axis 29. Regarding the electrode group 14, the longitudinal direction of each electrode plate is the rolling direction γ (FIG. 2), and the width direction of each electrode plate is the rolling axis direction α (FIG. 1). The rolling-end edge E of the electrode group 14 (FIG. 2) is fixed to the outermost circumferential surface of the electrode group 14 by attaching a rolling-stop tape (not illustrated in the drawing). In FIG. 2, the separator 13 is omitted from the drawing.

The case main body 15 and the sealing body 16 constitute a metal battery case for storing the electrode group 14 and the nonaqueous electrolyte. Insulating plates 17 and 18 are disposed on the top and bottom, respectively, of the electrode group 14. The positive electrode lead 19 extends toward the sealing body 16 through a through hole of the upper insulating plate 17 and is welded to the lower surface of a filter 22 serving as the bottom plate of the sealing body 16. In the nonaqueous electrolyte secondary battery 10, a cap 26 that is the top plate of the sealing body 16 electrically connected to the filter 22 serves as a positive electrode terminal.

The case main body 15 is a metal container having the shape of a tube with an opening portion 15a and a bottom portion 15b, for example, having the shape of a circular cylinder with a bottom. The sealing body 16 is fixed to the opening portion 15a of the case main body 15 by swaging with a gasket 27 interposed therebetween so as to ensure sealing performance inside of the battery case. The case main body 15 has a shoulder portion 20, which is formed by swaging all around the opening end portion toward the inner circumference, and a grooved portion 21. The grooved portion 21 is formed by, for example, pressing the side surface portion from the outside and is a portion for supporting the sealing body 16. Preferably, the grooved portion 21 is formed into an annular shape in the circumferential direction of the case main body 15, and the upper surface thereof supports the sealing body 16. The sealing body 16 seals the opening portion of the case main body 15. The surface roughness of the inner surface of the case main body 15 is specified. This will be described later in detail.

The sealing body 16 includes the filter 22, a lower valve body 23, an insulating member 24, an upper valve body 25, and the cap 26 which are stacked successively from the electrode group 14. Each member constituting the sealing body 16 has, for example, a disc shape or a ring shape, and the members excluding the insulating member 24 are electrically connected to each other. The center portion of the lower valve body 23 and the center portion of the upper valve body 25 are connected to each other, and the insulating member 24 is interposed between the peripheral edge portions of the lower valve body 23 and the upper valve body 25. When the internal pressure of the battery is increased due to abnormal heat generation, for example, the lower valve body 23 ruptures, and the upper valve body 25 thereby bulges toward the cap 26 so as to be separated from the lower valve body 23. As a result, electrical connectivity between the lower valve body 23 and the upper valve body 25 is broken. When the internal pressure is further increased, the upper valve body 25 ruptures, and gas is discharged through an opening portion 26a of the cap 26.

The positive electrode plate 11 and the negative electrode plate 12 constituting the electrode group 14 will be described below in detail. The positive electrode plate 11 includes the positive electrode collector 31 and the positive electrode active material layers 32 and 33 disposed on the positive electrode collector 31. In the present embodiment, the positive electrode active material layers 32 and 33 are disposed on the respective surfaces of the positive electrode collector 31. Regarding the positive electrode collector 31, for example, metal foil of aluminum or the like or a film provided with the metal as a surface layer is used. A favorable positive electrode collector 31 is metal foil containing aluminum or an aluminum alloy as a primary component. The thickness of the positive electrode collector 31 is, for example, 10 µm to 30 µm.

Preferably, the positive electrode active material layers 32 and 33 contain a positive electrode active material, a conductive agent, and a binder. The positive electrode plate 11 is produced by coating both surfaces of the positive electrode collector 31 with a positive electrode mixture slurry containing the positive electrode active material, the conductive agent, the binder, and a solvent such as N-methyl-2-pyrrolidone (NMP) and performing drying and rolling.

Examples of the positive electrode active material include lithium transition metal oxides containing transition metal elements such as Co, Mn, and Ni. There is no particular limitation regarding the lithium transition metal oxides, and complex oxides denoted by a general formula $Li_{1+x}MO_2$ (in the formula, $-0.2<x\leq 0.2$ and M contains at least one of Ni, Co, Mn, and Al) are preferable.

Examples of the conductive agent include carbon materials such as carbon black (CB), acetylene black (AB), Ketjenblack, and graphite. Examples of the binder include fluororesins such as polytetrafluoroethylenes (PTFE) and polyvinylidene fluorides (PVdF), polyacrylonitriles (PAN), polyimides (PI), acrylic resins, and polyolefin-based resins. Meanwhile, these resins may be used in combination with carboxymethyl cellulose (CMC) or a salt thereof, polyethylene oxide (PEO), or the like. These may be used alone, or at least two types may be used in combination.

A plain portion (not illustrated in the drawing) at which the surface of the metal constituting the positive electrode collector 31 is exposed is disposed in the positive electrode plate 11. The plain portion is a portion to be connected to the positive electrode lead 19 and is a portion in which the surface of the positive electrode collector 31 is not covered by the positive electrode active material layer. The positive electrode lead 19 is connected to the plain portion by, for example, ultrasonic welding.

The negative electrode plate 12 includes the negative electrode collector 35 and the negative electrode active material layers 36 and 37 disposed on the negative electrode collector 35. In the present embodiment, the negative electrode active material layers 36 and 37 are disposed on the respective surfaces of the negative electrode collector 35. Further, in the negative electrode plate 12, a rolling-start-side plain region (not illustrated in the drawing), a double-sided active material region 12a, a single-sided active material region 12b, and a rolling-end-side plain region 12c are arranged successively from where rolling starts toward where rolling ends. In the double-sided active material region 12a, the negative electrode active material layers 36 and 37 are disposed on the respective surfaces of the negative electrode collector 35. In the single-sided active material region 12b, the negative electrode active material layer 36 is disposed on the roll inner surface only of the negative electrode collector 35. In the plain region, both surfaces of the negative electrode collector 35 are exposed without being covered with the negative electrode active material layer. The single-sided active material region 12b extends about one revolution from the rolling-end edge of the double-sided active material region 12a to the rolling-end edge of the single-sided active material region 12b, and the plain region 12c further extends from the rolling-end edge of the single-sided active material region 12b. Consequently, the negative electrode collector 35 in part of the single-sided active material region 12b and in the plain region 12c is exposed at the outermost circumferential surface of the electrode group 14 in the circumferential direction. The negative electrode collector 35 is composed of, for example, metal foil of copper or the like. The thickness of the negative electrode collector 35 is, for example, 5 µm to 30 µm. In FIG. 2, the plain region 12c of the negative electrode plate 12 is indicated as being at a distance from the roll outer surface of the single-sided active material region 12b inside the plain region 12c. However, actually, the roll inner surface of the plain region 12c is in contact with the roll outer surface of the single-sided active material region 12b.

Preferably, the negative electrode active material layers 36 and 37 contain a negative electrode active material and a binder. The negative electrode plate 12 is produced by, for example, coating both surfaces of the negative electrode collector 35 with a negative electrode mixture slurry containing the negative electrode active material, the binder, water, and the like and performing drying and rolling.

There is no particular limitation regarding the negative electrode active material provided that lithium ions can be reversibly occluded and released, and, for example, carbon materials such as natural graphite and artificial graphite, metals such as Si and Sn which are alloyed with lithium, and alloys, complex oxides, and the like containing these materials can be used. In particular, using a negative electrode active material that expands to a great extent during charging enables the contact resistance between the negative electrode collector 35 and the case main body 15 to be reduced. Consequently, it is preferable that the negative electrode active material contain a silicon material such as Si, a Si alloy, or a Si oxide. Regarding the binder contained in the negative electrode active material layers 36 and 37, for example, the same resins as in the case of the positive electrode plate 11 are used. In the case in which the negative electrode mixture slurry is prepared from an aqueous solvent, styrene-butadiene rubber (SBR), CMC or a salt thereof, polyacrylic acid or a salt thereof, polyvinyl alcohol, and the like can be used. These may be used alone, or at least two types may be used in combination.

Regarding the separator 13 (FIG. 1), a porous sheet having ion permeability and insulation performance is used. Specific examples of the porous sheet include microporous thin films, woven fabrics, and nonwoven fabrics. Olefin resins such as polyethylenes and polypropylenes are favorable as the material for forming the separator 13. The thickness of the separator 13 is, for example, 10 μm to 50 μm. The thickness of the separator 13 tends to be reduced in accordance with increased capacity and increased output of the battery. The separator 13 has a melting temperature of, for example, about 130° C. to 180° C.

Meanwhile, a rolling-stop tape (not illustrated in the drawing) is attached to the outermost circumferential surface of the electrode group 14 at which the negative electrode collector 35 of the negative electrode plate 12 is exposed so as to fix the rolling-end edge E of the negative electrode plate 12 (FIG. 2) that is the rolling-end edge of the electrode group 14.

The surface roughness of the inner surface of the case main body 15 is specified as described below. FIG. 3 is a sectional view of the case main body 15 before the shoulder 20 and the grooved portion 21 are formed. At least part of the inner surface of the case main body 15 in the longitudinal direction (corresponding to the rolling axis direction α in FIG. 1) is allocated to the first region S1 and the second region S2. The first region S1 is a region of the inner surface of the case main body 15 from an opening-portion-side edge 15c to the position in contact with the bottom-portion-side edge 27a of the gasket 27 (FIG. 1). In FIG. 3, the position at which the inner surface of the case main body 15 is in contact with the bottom-portion-side edge 27a of the gasket 27 is indicated by L1, and the first region S1 is indicated by arrow A1.

The second region S2 is a region of the inner surface of the case main body 15 opposing the outermost circumferential surface of the negative electrode collector 35 that is the outermost circumferential surface of the electrode group 14 in the radial direction. In FIG. 3, the portions corresponding to both ends of the second region S2 in the length direction (corresponding to the rolling axis direction a in FIG. 1) are indicated by L2 and L3, and the second region S2 is indicated by arrow A2. At this time, the arithmetic mean roughness Ra1 of the first region S1 and the arithmetic mean roughness Ra2 of the second region S2 are specified to satisfy Ra1<Ra2.

For example, on a basis of the arithmetic mean roughness specified in JIS B 0601-2001, the arithmetic mean roughness Ra1 of the first region S1 is less than 0.4 μm, and the arithmetic mean roughness Ra2 of the second region S2 is 0.4 μm or more and 3 μm or less.

According to the nonaqueous electrolyte secondary battery 10 above, the arithmetic mean roughness Ra1 and the arithmetic mean roughness Ra2 of the first region S1 and the second region S2, respectively, of the inner surface of the case main body 15 are specified to satisfy Ra1<Ra2. Consequently, in the configuration in which the metal foil negative electrode collector 35 of the negative electrode plate 12 as the outermost circumferential surface of the electrode group 14 is in contact with the case main body 15, the electrical contact resistance between the negative electrode collector 35 and the second region S2 of the case main body 15 can be reduced. In general, to reduce electrical contact resistance with respect to surface-to-surface contact between two metal materials, it is considered that the surface roughness of the metal material has to be reduced so as to increase the contact area. However, the inventors of the present disclosure found that the metal foil negative electrode collector 35 as described in the embodiment has flexibility and is deformed along the uneven shape of the inner surface of the case main body 15. Therefore, setting the arithmetic mean roughness Ra2 of the second region S2 to be greater than Ra1 enables the contact area between the negative electrode collector 35 and the second region S2 of the case main body 15 to be increased. As a result, since the electrical contact resistance between the negative electrode collector 35 and the second region S2 of the case main body 15 can be reduced, higher output of the nonaqueous electrolyte secondary battery 10 can be realized.

Further, since the arithmetic mean roughness Ra1 of the first region S1 of the case main body 15 is reduced, the wettability of the first region S1 deteriorates, and the electrolytic solution is readily repelled. Consequently, the electrolytic solution attached to the surface of the case main body 15 readily flows down toward the bottom portion 15b along the surface of the case main body 15, and, in addition, the electrolytic solution can be suppressed from creeping up toward the opening. Therefore, the electrolytic solution is suppressed from seeping. As a result, high reliability can be realized with respect to the sealing portion that is formed based on contact between the first region S1 and the gasket 27.

Figure 4:
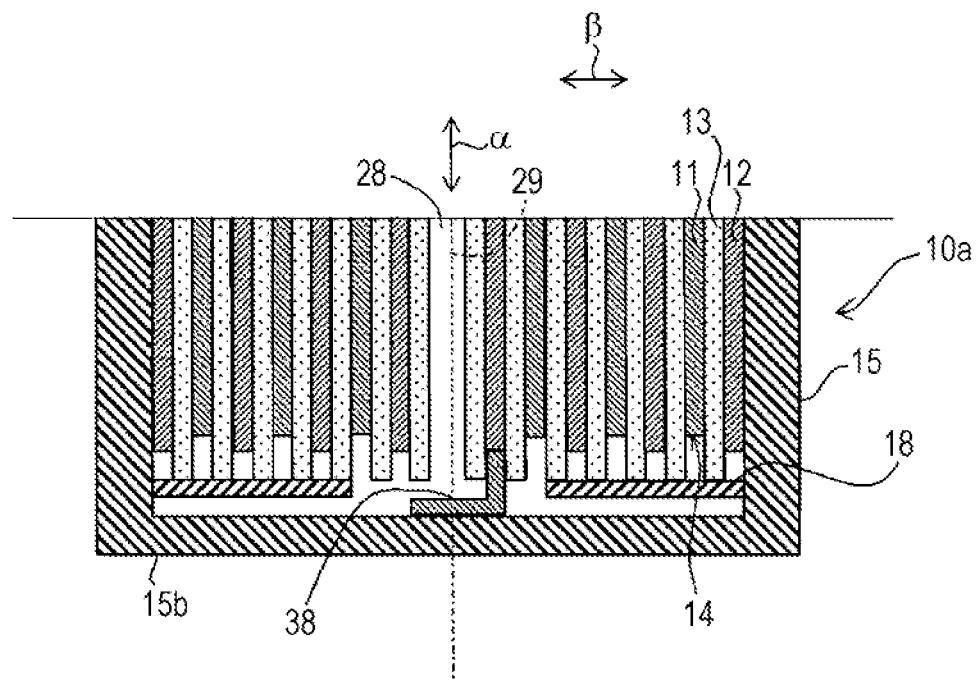
FIG. 4 is a sectional view of the lower half portion of a nonaqueous electrolyte secondary battery in another example of an embodiment.

FIG. 4 is a sectional view of the lower half portion of a nonaqueous electrolyte secondary battery 10a in another example of the embodiment. Regarding the nonaqueous electrolyte secondary battery 10a, in the same manner as the configuration in FIG. 1 to FIG. 4, a negative electrode collector exposed at the outermost circumferential surface of the electrode group 14 is in contact with the inner surface of a tubular portion of the case main body 15. In addition to this, regarding the negative electrode collector, a negative electrode lead 38 is connected to a portion located at the inner circumferential portion of the electrode group 14. Regarding the negative electrode lead 38, a portion that extends downward from the negative electrode collector is electrically connected to a bottom portion 15b of the case main body 15. Consequently, the rolling-start-side edge of the negative electrode plate 12 is electrically connected to the bottom portion 15b of the case main body 15 through the negative electrode lead 38. The negative electrode lead 38 is a band-like conductive member. There is no particular limitation regarding the constituent material of the negative electrode lead 38. Preferably, the negative electrode lead 38 is composed of a metal containing nickel or copper as a primary component or a metal containing both nickel and copper. According to the above-described configuration, further favorable current collecting performance of the negative electrode can be readily ensured. In the present example, the other components and the operations are the same as in the configurations illustrated in FIG. 1 to FIG. 3.

EXAMPLES

Next, a nonaqueous electrolyte secondary battery in example 1 will be described.

Example 1

[Production of Positive Electrode Plate]

A lithium-nickel-cobalt-aluminum complex oxide represented by $LiNi_{0.88}Co_{0.09}Al_{0.03}O_2$ was used as a positive electrode active material. Thereafter, 100 parts by mass of $LiNi_{0.88}Co_{0.09}Al_{0.03}O_2$ (positive electrode active material), 1.0 parts by mass of acetylene black, and 0.9 parts by mass of polyvinylidene fluoride (PVDF) (binder) were mixed in a solvent, N-methyl-2-pyrrolidone (NMP), so as to prepare a positive electrode mixture slurry. Subsequently, both surfaces of an elongated aluminum foil positive electrode collector were uniformly coated with the paste-like positive electrode mixture slurry, drying was performed in a dryer so as to remove NMP, and rolling by using a roll press machine was performed so as to obtain an elongated positive electrode plate having a predetermined thickness. Further, the positive electrode plate subjected to rolling was cut into a predetermined electrode size so as to produce a positive electrode plate 11. In this regard, the crystal structure of $LiNi_{0.88}Co_{0.09}Al_{0.03}O_2$ is a layered rock salt structure (hexagonal crystal, space group R3-$m$). In addition, a plain portion in which an active material was not disposed was formed in the center portion of the positive electrode plate 11 in the length direction, and an aluminum positive electrode lead was connected to the resulting plain portion by ultrasonic welding.

[Production of Negative Electrode Plate]

A mixture of 95 parts by mass of graphite powder and 5 parts by mass of silicon oxide was used as a negative electrode active material. Thereafter, 100 parts by mass of negative electrode active material, 1 part by mass of styrene-butadiene rubber (SBR) serving as a binder, and 1 part by mass of carboxymethyl cellulose (CMC) serving as a thickener were mixed. The resulting mixture was dispersed in water so as to prepare a negative electrode mixture slurry. Both surfaces of a copper foil negative electrode collector were coated with the resulting negative electrode mixture slurry, drying was performed by using a dryer, and rolling was performed by using a compression roller so as to produce an elongated negative electrode plate having a predetermined thickness. The elongated negative electrode plate was cut into a predetermined electrode size so as to produce a negative electrode plate 12. In addition, a negative electrode lead composed of a nickel-copper-nickel clad material was connected, by ultrasonic welding, to a position in the plain portion of the negative electrode plate 12 that serves as the inner circumferential portion of the electrode group after rolling.

[Preparation of Nonaqueous Electrolyte]

Ethylene carbonate (EC) and dimethyl carbonate (DMC) were mixed at a volume ratio of EC:DMC=1:3, 5 parts by mass of vinylene carbonate (VC) was added to 100 parts by mass of the resulting mixture, and 1.5 mol/L of $LiPF_6$ was dissolved so as to prepare a nonaqueous electrolytic solution serving as a nonaqueous electrolyte.

[Production of Electrode Group]

A roll-type electrode group 14 was produced by spirally rolling the resulting positive electrode plate 11 and negative electrode plate 12 with a polyolefin-based resin separator 13 interposed therebetween. At this time, a copper foil negative electrode collector 35 was exposed at the outermost circumference of the electrode group 14. The outer diameter of the electrode group 14 was controlled so that the contact area of 290 mm$^2$ or more was ensured when the electrode group 14 was arranged in the case main body 15 and the negative electrode collector 35 was brought into contact with the inner surface of the tubular portion of the case main body 15.

[Adjustment of Surface Roughness of Case Main Body]

The case main body 15 was produced by using a steel plate. The inner surface of the case main body 15 is a worked portion based on plastic deformation, and the surface roughness of the worked portion is in accordance with the surface roughness of the material. Therefore, the case main body 15 was produced by preparing a material having an arithmetic mean roughness based on JIS B 0601-2001 of 0.4 to 3 μm so as to reduce the contact resistance between the second region S2 of the inner surface of the case main body 15 and the copper foil negative electrode collector as the outermost circumference of the electrode group 14. Regarding the inner surface of the case main body 15, the first region S1 that had low surface roughness and that was upper than the grooved portion 21 was worked by using a drawing die having surface roughness of less than 0.4 μm during a plasticity step, and the surface roughness was adjusted by transferring the surface roughness of the die to the first region S1.

[Production of Nonaqueous Electrolyte Secondary Battery]

A disc-like insulating plate 18 was inserted inside the above-described case main body 15, the electrode group 14 was inserted above the insulating plate 18, and the negative electrode lead connected to the negative electrode plate 12 was connected to the inner surface of the bottom portion 15$b$ of the case main body 15 by welding. Subsequently, an insulating plate 17 was inserted above the electrode group 14 inside the case main body 15. The grooved portion 21 having a cross section in the shape of the letter U was formed by plastic working all around the circumference of the case main body on the opening-portion-side above the insulating plate 17. Thereafter, a predetermined amount of the prepared nonaqueous electrolytic solution was placed inside the case main body 15 in which the electrode group 14 was placed. The positive electrode lead connected to the positive electrode plate 11 was connected to the sealing body 16 by welding, the sealing body 16 was inserted inside the opening portion of the case main body 15 with the gasket 27 interposed therebetween, and the opening end portion of the case main body 15 was swaged so as to produce a hermetic nonaqueous electrolyte secondary battery 10.

<Simulation>

The inventors of the present disclosure performed a simulation of the surface roughness by using a can material test specimen imitating the case main body 15 and a metal foil test specimen imitating the negative electrode collector 35. Each of the can material test specimen and the metal foil test specimen was in the shape of a sheet having a size of 19.5 mm×19.5 mm.

Figure 5:
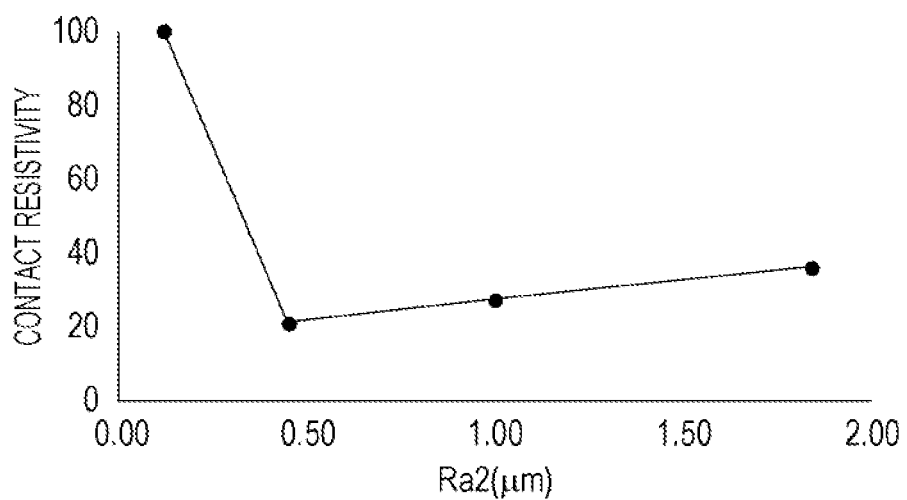
FIG. 5 is a diagram illustrating the experimental result in an embodiment and is a diagram illustrating the relationship between the surface roughness and the contact resistivity of a second region.

In a first simulation, a pressure imitating the inside of the battery was applied to the two test specimens stacked one another, and an electrical resistance value between the test specimens was measured by using a four-terminal method. FIG. 5 illustrates the relationship between the contact resistivity based on the electrical resistance value measured in the experiment and the surface roughness (arithmetic mean roughness Ra2) of the can material test specimen. The contact resistivity illustrated in FIG. 5 is indicated by a relative value where the contact resistivity was assumed to be 100 when the arithmetic mean roughness Ra2 was 0.1 μm. According to the result illustrated in FIG. 5, there was a tendency of the contact resistivity to reduce when the arithmetic mean roughness Ra2 was 0.4 µm or more. Consequently, it is conjectured that a result having the same tendency will be obtained in the embodiment.

In a second simulation, two tabular can material test specimens were used. The arithmetic mean roughness Ra1 of the surface of each of the two can material test specimens was 0.1 µm or 0.4 µm. Each of the two test specimens was stood perpendicularly to a horizontal plane, and the electrolytic solution was dripped along the surface by using a dropping pipette. After a lapse of 10 seconds, the amount of the electrolytic solution remaining at the dripping place was compared. As a result, regarding the test specimen having an arithmetic mean roughness Ra1 of 0.1 µm, the electrolytic solution did not remain, but regarding the test specimen having an arithmetic mean roughness Ra1 of 0.4 µm, the electrolytic solution remained. Consequently, it was ascertained that the amount of the electrolytic solution remaining on the surface of the case main body 15 can be decreased by reducing the surface roughness.

In this regard, in the above-described embodiment, the case in which the negative electrode collector 35 was exposed at the outermost circumferential surface of the electrode group 14 in the rolling direction and in which the negative electrode collector 35 was in contact with the inner surface of the case main body 15 was explained. Meanwhile, a configuration in which the negative electrode collector is exposed at only part of the outermost circumferential surface of the electrode group in the rolling direction and in which the negative electrode collector is in contact with the inner surface of the case main body 15 may be adopted. Alternatively, the positive electrode plate 11 may be arranged at the outermost circumference of the electrode group 14 so that the positive electrode collector is in contact with the inner surface of the case main body 15.

REFERENCE SIGNS LIST 10, 10a nonaqueous electrolyte secondary battery, 11 positive electrode plate, 12 negative electrode plate, 12a double-sided active material region, 12b single-sided active material region, 12c plain region, 13 separator, 14 electrode group, 15 case main body, 15a opening portion, 15b bottom portion, 15c opening-portion-side edge, 16 sealing body, 17, 18 insulating plate, 19 positive electrode lead, 20 shoulder portion, 21 grooved portion, 22 filter, 23 lower valve body, 24 insulating member, 25 upper valve body, 26 cap, 26a opening portion, 27 gasket, 27a bottom-portion-side edge, 28 space, 29 rolling axis, 31 positive electrode collector, 32, 33 positive electrode active material layer, 35 negative electrode collector, 36, 37 negative electrode active material layer, 38 negative electrode lead

The invention claimed is:

1. A nonaqueous electrolyte secondary battery comprising:
    a tubular case main body having an opening portion and a bottom portion;
    a sealing body fixed to the opening portion of the case main body by swaging with a gasket interposed therebetween; and
    a roll-type electrode group which is stored in the case main body and in which a positive electrode plate and a negative electrode plate are rolled with a separator interposed therebetween,
    wherein a metal foil collector of one electrode plate of the positive electrode plate and the negative electrode plate is exposed at at least part of the outermost circumferential surface of the electrode group in the rolling direction, the collector being in contact with the inner surface of the case main body,
    when a region of the inner surface of the case main body from the opening-portion-side edge to the position in contact with the bottom-portion-side edge of the gasket is denoted as a first region and a region of the inner surface of the case main body opposing the outermost circumferential surface of the electrode group is denoted as a second region,
    the arithmetic mean roughness Ra1 of the first region and the arithmetic mean roughness Ra2 of the second region satisfy Ra1<Ra2, and
    the metal foil collector of the one electrode plate is free of an electrode lead attached to the outermost circumferential surface of the electrode group.

2. The nonaqueous electrolyte secondary battery according to claim 1, wherein the arithmetic mean roughness Ra1 of the first region is less than 0.4 µm, and the arithmetic mean roughness Ra2 of the second region is 0.4 µm or more and 3 µm or less.

3. The nonaqueous electrolyte secondary battery according to claim 1, wherein the one electrode plate is the negative electrode plate.

4. The nonaqueous electrolyte secondary battery according to claim 3, wherein the rolling-start-side edge portion of the negative electrode plate is electrically connected to the bottom portion of the case main body through a negative electrode lead.

5. The nonaqueous electrolyte secondary battery according to claim 3, wherein both surfaces of the collector located at the outermost circumference of the electrode group are exposed without being covered by a negative electrode active material layer.

6. The nonaqueous electrolyte secondary battery according to claim 3, wherein the collector located at the outermost circumference of the electrode group is composed of a metal foil of Cu.

7. The nonaqueous electrolyte secondary battery according to claim 1, wherein the negative electrode plate contains a silicon material as a negative electrode active material.

* * * * *